US008215825B2

(12) United States Patent
Flynn et al.

(10) Patent No.: US 8,215,825 B2
(45) Date of Patent: Jul. 10, 2012

(54) FLUID MIXING APPARATUS AND METHOD

(75) Inventors: Harry E. Flynn, Edmond, OK (US);
Robert O. Martin, Edmond, OK (US);
Charles A. Natalie, Edmond, OK (US)

(73) Assignee: Tronox LLC, Oklahoma City, OK (US)

( * ) Notice: Subject to any disclaimer, the term of this patent is extended or adjusted under 35 U.S.C. 154(b) by 1116 days.

(21) Appl. No.: 11/915,010

(22) PCT Filed: May 20, 2005

(86) PCT No.: PCT/US2005/017764
§ 371 (c)(1),
(2), (4) Date: Nov. 20, 2007

(87) PCT Pub. No.: WO2006/126987
PCT Pub. Date: Nov. 30, 2006

(65) Prior Publication Data
US 2008/0219087 A1    Sep. 11, 2008

(51) Int. Cl.
*B01F 5/04* (2006.01)
(52) U.S. Cl. ......... 366/152.1; 366/160.1; 137/7; 137/10
(58) Field of Classification Search ............ 137/10, 137/7; 366/163.2, 182.4, 167.1, 174.1, 175.2, 366/176.1, 176.2, 152.1, 152.2, 160.1, 162.1; 423/613; 700/285
See application file for complete search history.

(56) References Cited

U.S. PATENT DOCUMENTS

| 154,544 A | * | 9/1874 | Doten ............... 366/167.1 |
| 2,791,490 A | * | 5/1957 | Willcox ............. 423/613 |
| 2,946,293 A | * | 7/1960 | Henshaw ........... 417/183 |
| 3,069,281 A | * | 12/1962 | Wilson ............. 106/437 |
| 3,360,341 A | * | 12/1967 | Tillmann et al. .... 422/310 |
| 3,372,001 A | * | 3/1968 | Wendell ........... 422/150 |
| 3,473,787 A | * | 10/1969 | Bartlett ............ 366/176.2 |
| 3,522,017 A | * | 7/1970 | Barfield, Jr. ........ 422/201 |
| 3,643,688 A | * | 2/1972 | Meinert ............ 137/556 |
| 3,764,667 A | * | 10/1973 | Thring et al. ...... 423/613 |
| 3,799,195 A | * | 3/1974 | Hermans .......... 137/553 |
| 3,838,977 A | * | 10/1974 | Warren ............ 422/179 |
| 3,877,682 A | * | 4/1975 | Moss .............. 366/132 |
| 4,006,791 A | * | 2/1977 | Feldmann et al. ... 180/176 |
| 4,053,577 A | | 10/1977 | Arkless |
| 4,354,762 A | * | 10/1982 | Cantoni ........... 366/162.1 |
| 4,803,056 A | | 2/1989 | Morris et al. |
| 4,832,499 A | * | 5/1989 | Fiorentini ......... 366/152.1 |
| 4,966,466 A | * | 10/1990 | Soechtig .......... 366/132 |
| 5,145,253 A | * | 9/1992 | Paul et al. ......... 366/101 |
| 5,196,181 A | * | 3/1993 | Hartmann ......... 423/613 |
| 5,366,288 A | * | 11/1994 | Dahllof et al. ..... 366/176.2 |

(Continued)

FOREIGN PATENT DOCUMENTS
GB            1013888         * 12/1965
(Continued)

*Primary Examiner* — Charles E Cooley
(74) *Attorney, Agent, or Firm* — McAfee & Taft

(57) ABSTRACT

Methods and apparatus are provided for influencing mixing of a first fluid injected through a slot into a second fluid flowing through a conduit, by automatically or remotely adjusting the slot width to provide at least a certain slot velocity of the first fluid being introduced into the conduit. In particular, methods and apparatus are provided for mixing control in injecting titanium tetrachloride into an oxygen stream in a process for making titanium dioxide.

21 Claims, 4 Drawing Sheets

U.S. PATENT DOCUMENTS

| | | | | |
|---|---|---|---|---|
| 5,556,200 | A | * | 9/1996 | Ekholm et al. ............. 366/175.2 |
| 5,573,744 | A | | 11/1996 | Gebben et al. |
| 5,586,051 | A | * | 12/1996 | Miranda et al. ............... 700/285 |
| 6,106,145 | A | * | 8/2000 | Winslow .................... 366/176.2 |
| 6,207,131 | B1 | | 3/2001 | Magyar et al. |
| 6,350,427 | B1 | * | 2/2002 | Yuill et al. .................... 423/613 |
| 6,387,347 | B1 | | 5/2002 | Deberry et al. |
| 6,802,638 | B2 | * | 10/2004 | Allen .......................... 366/152.1 |
| 2002/0002310 | A1 | * | 1/2002 | Grenacher et al. ............ 568/451 |
| 2005/0220702 | A1 | * | 10/2005 | Martin et al. ................. 423/613 |
| 2009/0141584 | A1 | * | 6/2009 | Boer et al. .................... 366/336 |

FOREIGN PATENT DOCUMENTS

GB          1022073      *   3/1966

* cited by examiner

FLUID MIXING APPARATUS AND METHOD

FIELD OF THE INVENTION

The present invention generally relates to apparatus and methods useful for the mixing of fluids by injecting a first fluid through an injection slot and into a conduit transporting a second fluid. More specifically, the present invention facilitates maintaining a substantially constant slot velocity of the first fluid through the injection slot by utilizing an automatically adjusting injection slot. The present invention is especially useful in a process for producing titanium dioxide by vapor phase oxidation of titanium tetrachloride ($TiCl_4$), wherein the titanium tetrachloride is introduced through an injection slot and into a conduit transporting an oxygen ($O_2$) stream.

BACKGROUND AND SUMMARY OF THE INVENTION

The production of titanium dioxide by the vapor phase oxidation of titanium tetrachloride has been known in the art for a long time and is generally described by the following reaction:

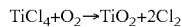

$$TiCl_4 + O_2 \rightarrow TiO_2 + 2Cl_2$$

It is known that this reaction can be initiated by heating the reactants (oxygen and titanium tetrachloride) to a suitable temperature. In a typical process, preheated titanium tetrachloride vapor and a preheated stoichiometric excess of oxygen are mixed at high flow rates at a pressure above atmospheric pressure in a tubular reactor (also referred to as an oxidizer) or series of such reactors wherein the titanium tetrachloride vapor reacts with the oxygen to produce solid titanium dioxide particles. The reaction of titanium tetrachloride vapors with oxygen to form titanium dioxide is exothermic. Methods and equipment for preheating the reactants are known in the art.

Typically, the reactors used for producing titanium dioxide have a generally tubular shape and at least a portion of the oxygen flow is introduced at one end of the reactor, forming an oxygen stream. The oxygen stream is transported through a conduit to a reaction chamber. The titanium tetrachloride is injected into the conduit through an injection slot at a point downstream from the end where the oxygen flow is introduced (that is, the upstream end) and upstream from the reaction chamber. Injection slots of the type conventionally used for titanium tetrachloride oxidation reactors may comprise, for example, a circumferential slot in the wall of the conduit, an arrangement of circumferential slots in the conduit wall, a separate injection chamber formed within the reactor, or an arrangement of separate injection chambers formed within the reactor.

One typical reactor utilized in the process for producing titanium dioxide, as described hereinabove, is shown in FIG. 1. In general, the reactor 100 comprises a first oxidizing gas introduction assembly 102 which receives preheated oxygen from oxygen preheat equipment 116 by way of a flowline 122 and introduces the oxygen through a conduit 128 and into a first reaction zone 104 formed in the reactor. The reactor 100 further comprises a first titanium tetrachloride vapor introduction assembly 106 which receives preheated titanium tetrachloride from titanium tetrachloride preheat equipment 118 by way of a flowline 124 and introduces titanium tetrachloride vapor through a first injection slot 108 into conduit 128. A second addition of preheated titanium tetrachloride may be made through a second titanium tetrachloride introduction assembly 110 receiving preheated titanium tetrachloride from titanium tetrachloride preheat equipment 120 by way of a flowline 126 and introducing the same through a second injection slot 112 into a second reaction zone 114. Secondary additions of preheated oxygen are also known, see, for example, U.S. Pat. No. 6,207,131 to Magyar et al. It will be appreciated that while first and second reaction zones 104 and 114 are described, the reaction between titanium tetrachloride and oxygen occurs in fact throughout the reactor downstream from an introduction of titanium tetrachloride and is not limited to any one particular reaction zone.

Typically, the titanium tetrachloride is preheated to a temperature from about 350° F. (177° C.) to about 1800° F. (982° C.) depending upon the particular preheat apparatus utilized. The oxygen is typically preheated to a temperature from about 1000° F. (538° C.) to about 2200° F. (1204° C.). First and subsequent additions, where employed, of titanium tetrachloride and/or oxygen may be at the same or different temperatures, see, for example, U.S. Pat. No. 6,387,347 to Deberry et al. (suggesting a secondary titanium tetrachloride addition at a lower temperature). The oxidation reaction temperature is typically from about 2300° F. (1260° C.) to about 2500° F. (1371° C.).

One of the most important aspects of oxidizer design concerns achieving an efficient mixing of the titanium tetrachloride and oxygen streams. In a typical reactor, efficient mixing generally requires that the titanium tetrachloride have a sufficient slot velocity as it passes through the slot and into the oxygen-carrying conduit. In typical oxidizers, such as the oxidizer 100 shown in FIG. 1, the slot size is fixed such that the pressure drop from the titanium tetrachloride vapor supply apparatus to the inside of the oxidizer is about 1 psi to about 2 psi. That is, the pressure at which the titanium tetrachloride is delivered (typically being from about 20 to 50 psig) is about 1 psi to about 2 psi higher than the pressure inside the oxidizer. This pressure drop will at typical titanium tetrachloride delivery pressures generally allow a slot velocity of about 200 ft/sec to about 300 ft/sec.

If the pressure at which the titanium tetrachloride is delivered decreases, the pressure drop and, thus the slot velocity, will also be reduced, resulting in less efficient mixing of the titanium tetrachloride and oxygen. A reduction in the titanium tetrachloride delivery pressure sometimes occurs as the result of a reduction in the flow rates from one or more chlorinators producing titanium tetrachloride in a production facility, for example, due to a shut down for maintenance or repair. Reduced titanium tetrachloride flow rates can also be seen as the result of fouling in one or more flowlines delivering titanium tetrachloride to the titanium tetrachloride supply apparatus.

To maintain efficient mixing of titanium tetrachloride and oxygen at reduced titanium tetrachloride flow rates, the slot velocity should be maintained. Maintaining slot velocity at reduced titanium tetrachloride volumetric flow rates requires the injection slot size to be reduced. Similarly, if the titanium tetrachloride flow rate increases then the size of the injection slot needs to be increased if the slot velocity is to be maintained. Thus, changing titanium tetrachloride flow rates requires a corresponding adjustment to the size of the titanium tetrachloride injection slot(s).

Those skilled in the art will appreciate as well, that where titanium tetrachloride flow rates are not changed but greater or lesser mixing is nevertheless desired for some reason (for controlling particle size of the produced titanium dioxide, for example), a corresponding change in slot velocity would likewise require a change in the size of the injection slot.

Generally in commercial reactors, however, the titanium tetrachloride injector will as indicated above have a fixed size injection slot through which the titanium tetrachloride is introduced into the reactor. This fixed size (or fixed "width", as the slot size is typically described) injection slot must be adjusted manually in reactors of the prior art. In order to change the width of the injection slot in existing reactors, the oxidation process is first shut down. The reactor is then allowed to cool sufficiently so the reactor and/or injector can be taken apart and appropriate changes can be made. The reactor must then be reheated so that production can begin again. Thus, changing the width of the titanium tetrachloride injection slot can take several hours, during which production must be discontinued and costs incurred in making the changes and getting the reactor back online. Consequently, operators have tended to accept a certain degree of sub-optimum mixing in their oxidizers.

The present invention provides for novel apparatus and methods for injecting a first fluid flow into a conduit carrying a second fluid, wherein a desired degree of mixing can be maintained or established without the tradeoffs required in manually adjusting slot widths. In a first aspect, the present invention provides a fluid mixing apparatus comprising a fluid supply apparatus for supplying a first fluid; a conduit for transporting a second fluid; an adjustable injection slot providing fluidic communication between the fluid supply apparatus for the first fluid and the conduit carrying the second fluid; and a means for automatically or remotely adjusting the adjustable injection slot to maintain a substantially constant slot velocity or achieve a desired, new slot velocity. By "automatically or remotely adjusting" it is meant that the injection slot can be adjusted without manually disassembling the apparatus and adjusting the slot, as has been required previously. Further, where the slot is "remotely" adjusted, the adjustment is accomplished by operator intervention, whereas "automatic" adjustments are triggered and accomplished by a change in operating conditions such that an adjustment is indicated. A non-limiting example of means for "automatically adjusting" the slot width is provided below as a preferred embodiment of the present invention.

In a second aspect, the present invention provides a method for mixing two fluids, comprising the steps of: introducing a first fluid through an injection slot and into a conduit transporting a second fluid; and adjusting the injection slot width (whether automatically or remotely) while continuing to introduce the first fluid into the conduit.

The present invention has been advantageously utilized in a titanium dioxide production process. In a preferred embodiment, the present invention can be advantageously utilized to adjust the titanium tetrachloride injection slot width in a titanium dioxide production reactor while online, for example, to automatically compensate for changes in the flow rate of titanium tetrachloride and in so doing maintain a substantially constant slot velocity for continued good mixing characteristics and a desired pigment particle size, or on the other hand to alter the mixing characteristics and pigment particle size from the oxidizer through altering the slot velocity and associated mixing in the oxidizer.

DESCRIPTION OF THE DRAWINGS

The present invention is illustrated by way of example in the following drawings in which like references indicate similar elements. The following drawings disclose various embodiments of the present invention for purposes of illustration only. The drawings are not intended to limit the scope of the invention.

DETAILED DESCRIPTION OF PREFERRED EMBODIMENTS OF THE INVENTION

In the following detailed description of preferred embodiments of the present invention, reference is made to the accompanying Drawings, which form a part hereof, and in which are shown by way of illustration specific embodiments in which the present invention may be practiced. It should be understood that other embodiments may be utilized and changes may be made without departing from the scope of the present invention. Those of ordinary skill in the art will recognize that the current invention will have usefulness with a variety of fluids. However, for the purposes of disclosing the preferred embodiment, the following disclosure will focus on the apparatus and methods for preparing titanium dioxide via the vapor phase oxidation of titanium tetrachloride.

Figure 1:
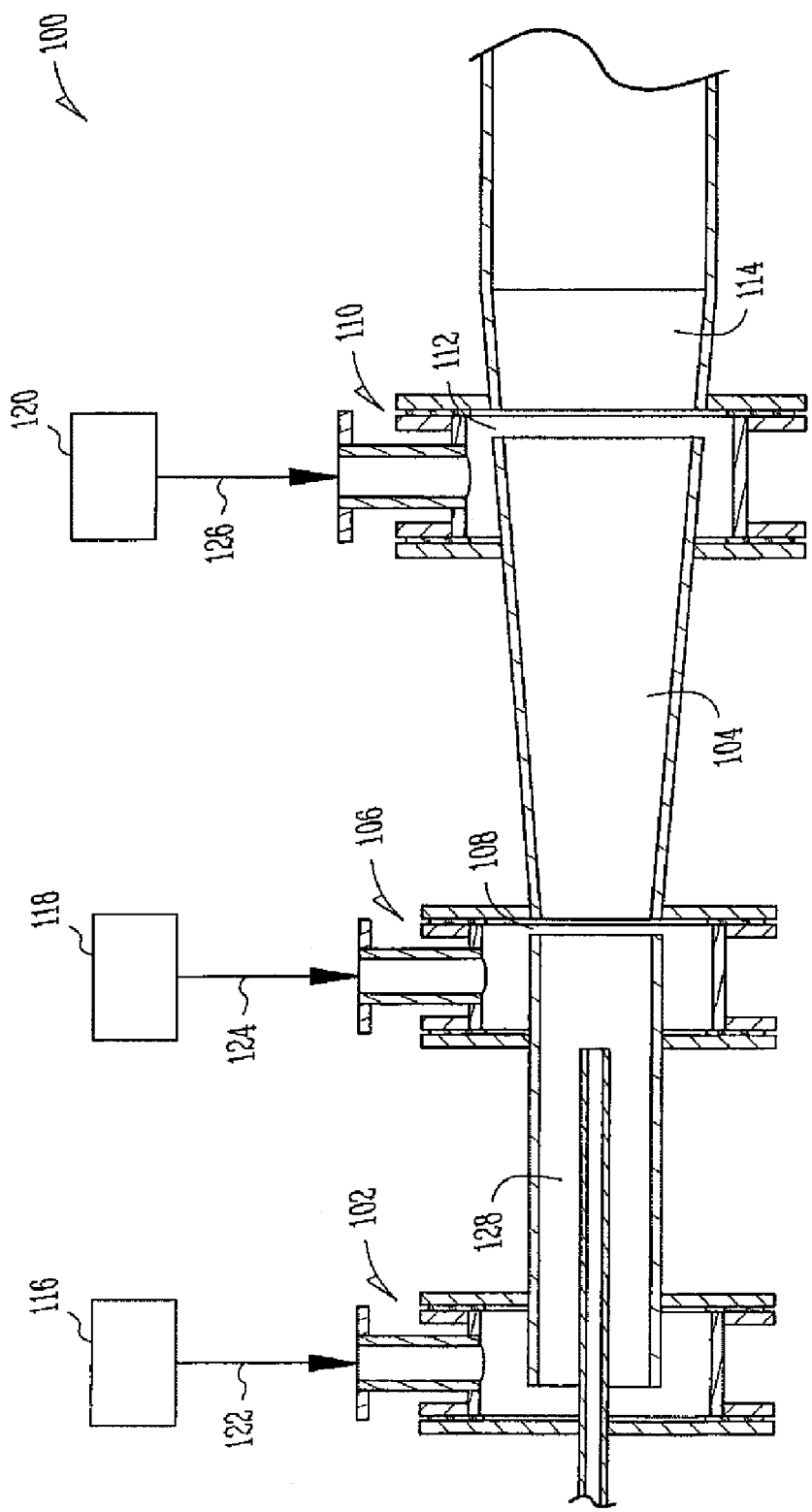
FIG. 1 illustrates a cross sectional view of one typical reactor of the prior art for producing titanium dioxide.

Efficient mixing of fluids (for example, titanium tetrachloride and oxygen) at high flow rates in reactors of the type shown in FIG. 1 generally requires a sufficient slot velocity to be maintained. The slot velocity is the speed at which a fluid (for example, titanium tetrachloride) passes through an injection slot such as those found in reactors (that is, oxidizers) used in the vapor phase oxidation of titanium tetrachloride. The present invention provides for the continued efficient mixing of fluids in situations where the flow rate of at least one of the fluids may vary, in particular but without limitation to where the flow rate of the fluid being introduced through an injection slot is reduced, through enabling a compensating online, on-stream adjustment of the injection slot to maintain at least the sufficient slot velocity. As has been mentioned, in the context of titanium dioxide production by the oxidizing of titanium tetrachloride, a reduction in the flow rate of titanium tetrachloride can often occur through a shutdown of an upstream chlorinator of titanium-bearing ores or through the effects of fouling in supply lines.

The flow rate of titanium tetrachloride in titanium dioxide production may vary from about 560 standard cubic feet per minute ("scfm") to about 1400 scfm. To maintain a slight stoichiometric excess of oxygen, the oxygen flow rates are typically set at from about 680 scfm to about 1680 scfm. Typically, the titanium tetrachloride is preheated to a temperature from about 350° F. (177° C.) to about 1800° F. (982° C.) depending upon the particular preheat apparatus utilized. The oxygen is typically preheated to a temperature from about 1000° F. (538° C.) to about 2200° F. (1204° C.). The oxidation reaction temperature is typically from about 2300° F. (1260° C.) to about 2500° F. (1371° C.). Oxygen preheat apparatus and titanium tetrachloride preheat apparatus are commercially available and well known in the art. The reactor can be of any known reactor design including those that are cooled with water or other heat exchange medium, those which are not cooled, those which are heated, those that are formed of a porous medium, etc.

In typical oxidizers, such as the oxidizer 100 shown in FIG. 1, the slot size is fixed such that the pressure drop from the titanium tetrachloride vapor supply apparatus to the inside of the oxidizer is about 1 psi to about 2 psi. That is, the pressure at which the titanium tetrachloride is delivered is about 1 psi to about 2 psi higher than the pressure inside the oxidizer. This pressure drop will generally correspond to a slot velocity of about 200 ft/sec to about 300 ft/sec for titanium tetrachloride, given a titanium tetrachloride delivery pressure of about 20 psig. A typical commercial oxidizer operating under the above conditions will produce from about 3 tons of titanium dioxide per hour to about 10 tons of titanium dioxide per hour.

If the pressure at which the titanium tetrachloride is delivered decreases because of a reduced titanium tetrachloride flow rate, the pressure drop and, thus the slot velocity, will also be reduced, resulting in less efficient mixing of the titanium tetrachloride and oxygen. Maintaining the desired slot velocity at reduced titanium tetrachloride flow rates requires the size of the injection slot (the "slot width") to be correspondingly reduced. Similarly, if the titanium tetrachloride flow rate increases then the size of the injection slot needs to be increased if the slot velocity is to be maintained.

Figure 2:
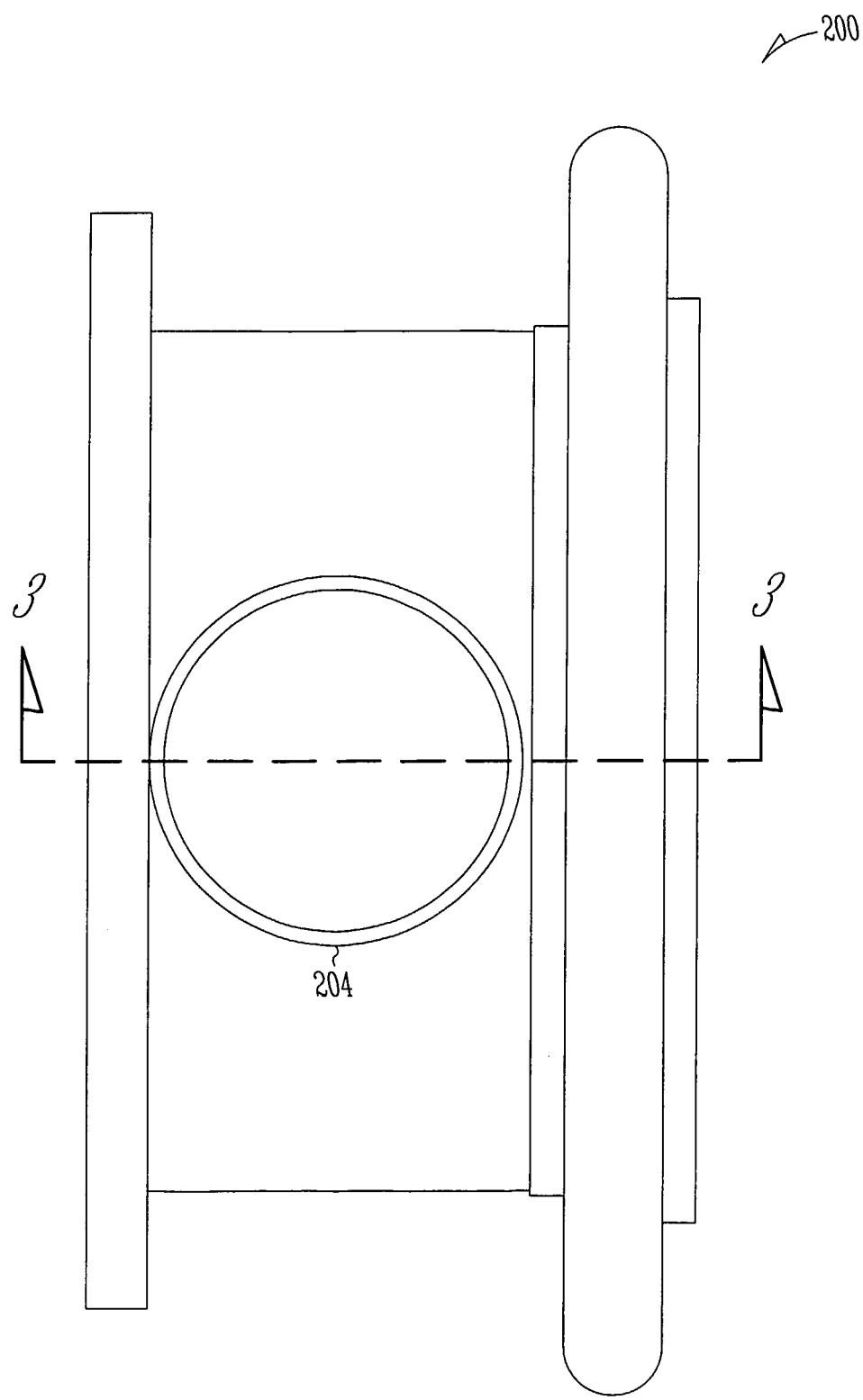
FIG. 2 illustrates a top down view of a fluid mixing apparatus of the present invention, in a preferred embodiment.
Figure 3:
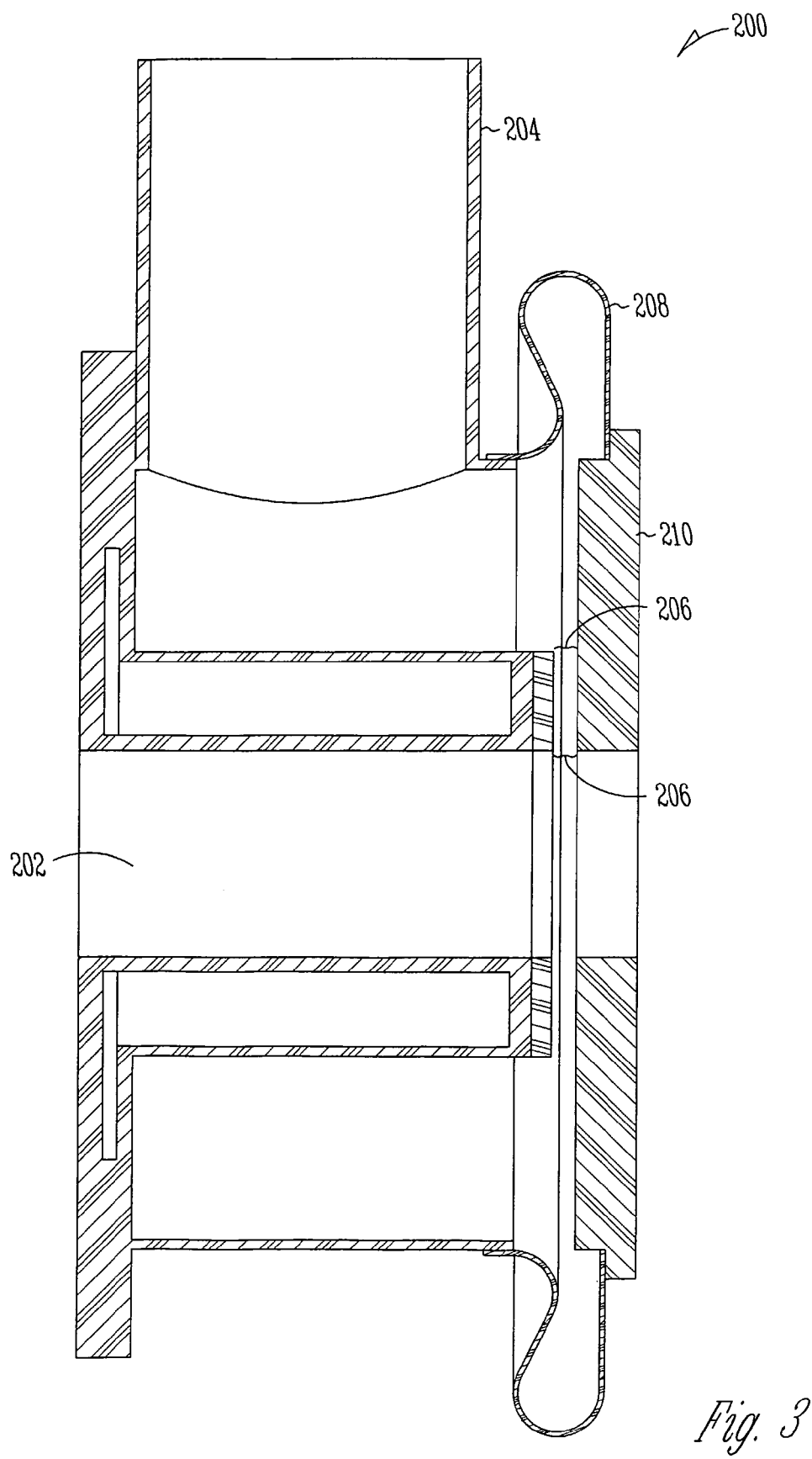
FIG. 3 illustrates a cross sectional view of the fluid mixing apparatus of FIG. 2, taken substantially along the line 3-3 of FIG. 2.
Figure 4:
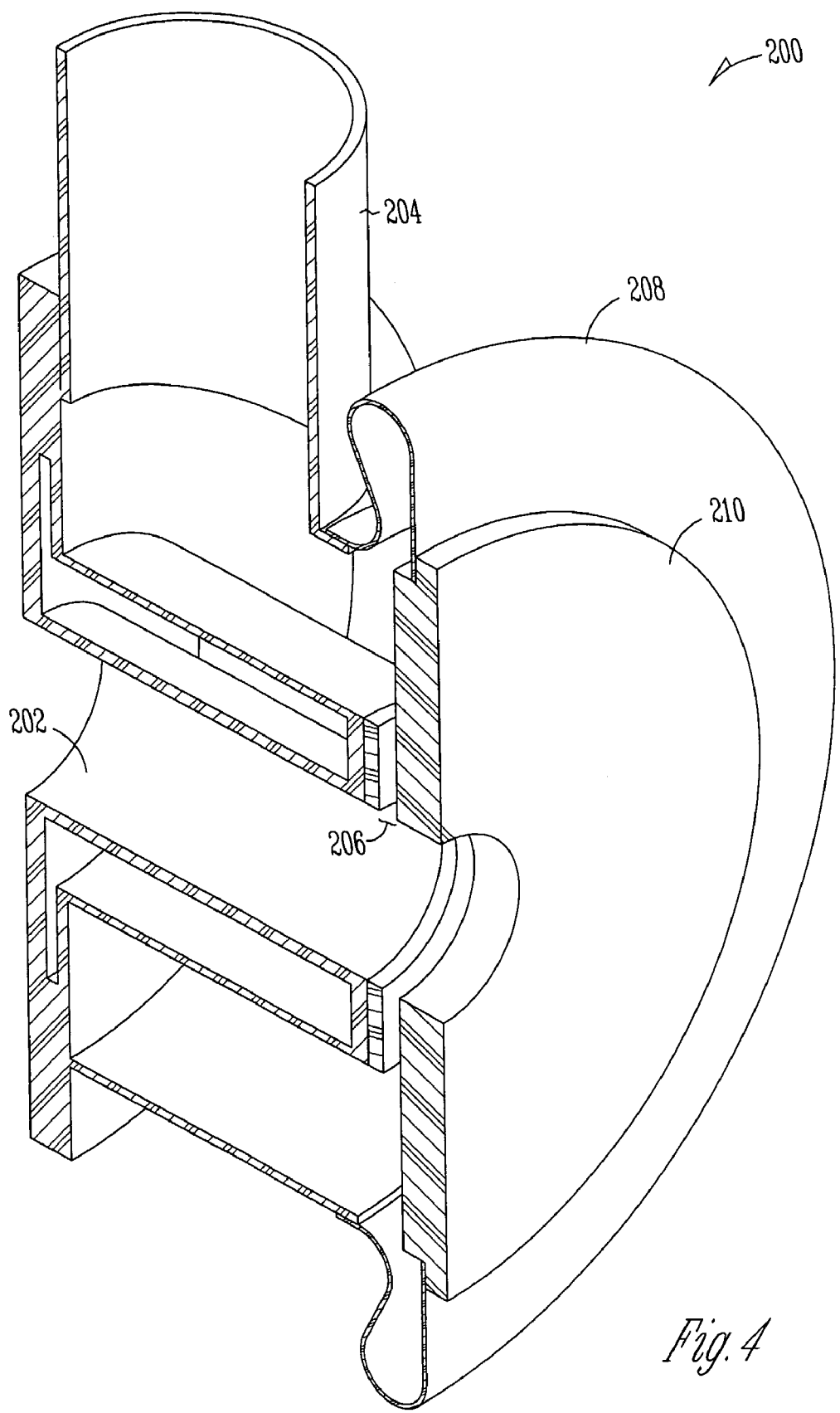
FIG. 4 illustrates a perspective view of the cross sectional view of the fluid mixing apparatus of FIG. 3.

A preferred embodiment of an apparatus according to the present invention for accomplishing these types of adjustments online and on-stream is shown in FIGS. 2 through 4. FIGS. 2-4 in particular illustrate a fluid mixing apparatus 200 of the present invention for mixing high flow rates of gaseous reactants in a reactor. The fluid mixing apparatus 200 of FIGS. 2-4 comprises a conduit 202; a fluid supply apparatus 204; an adjustable injection slot 206 providing fluidic communication between the supply apparatus 204 and the conduit 202; and a bellows 208, wherein the bellows automatically adjusts the adjustable injection slot in a manner explained below. The conduit 202 and the fluid supply apparatus 204 can each be utilized for injecting any high flow rate liquid or gas reactant. In an apparatus for producing titanium dioxide, the conduit 202 transports a preheated oxygen stream and the fluid supply apparatus 204 introduces the preheated titanium tetrachloride, so that the apparatus 200 in the context of a typical reactor 100 can preferably be used in place of one or both of the first and second titanium tetrachloride introduction assemblies 106 and 110, respectively.

In this embodiment of an apparatus of the present invention, the inside of the bellows 208 is exposed to the inside of the fluid supply apparatus 204. Thus, the pressure inside the bellows 208 is substantially the same as the pressure inside the fluid supply apparatus 204. For purposes of the present invention, a bellows can be any structure that changes shape (for example, expands or contracts) in response to changes in the pressure inside the fluid supply apparatus. The bellows 208 of the fluid mixing apparatus 200 expands as the pressure in the fluid supply apparatus 204 increases and contracts as the pressure in the fluid supply apparatus 204 decreases.

As shown in FIGS. 3 & 4, one end of the bellows 208 is attached to a non-movable portion of the fluid supply apparatus 204 and the other end of the bellows 208 is attached to a movable wall 210 defining one side of the injection slot 206. As the pressure in the fluid supply apparatus 204 decreases, for example due to a decrease in the flow rate of the fluid (titanium tetrachloride) to be injected, the bellows 208 contracts. The contracting of the bellows 208 causes the portion of the bellows 208 attached to the movable wall 210 to move the movable wall 210 in a manner making the injection slot 206 narrower. The narrower injection slot 206 causes the slot velocity to remain substantially constant even though the flow rate (volume per time unit) of the first fluid has decreased. Similarly, as the pressure in the fluid supply apparatus 204 increases, the bellows 208 expands. The expanding of the bellows 208 causes the portion of the bellows 208 attached to the movable wall 210 to move the movable wall 210 in a manner making the injection slot 206 wider. The wider injection slot 206 causes the slot velocity to remain substantially constant even though the volumetric flow rate of the first fluid has increased. In this manner, the bellows 208 automatically adjusts the adjustable slot to maintain a substantially constant slot velocity of the first fluid through the injection slot 206.

Similarly, when the bellows 208 automatically adjusts the adjustable slot, the pressure drop across the injection slot 206 is substantially maintained. For example, if the flow of titanium tetrachloride is increased, the resulting increase in pressure would increase the pressure in the fluid supply apparatus 204, which would cause the bellows 208 to expand and thereby increase the slot width, maintaining a substantially constant slot velocity and a substantially constant pressure drop across the injection slot 206. Similarly, if the flow of titanium tetrachloride is decreased, the resulting decrease in pressure would decrease the pressure in the fluid supply apparatus 204, causing the bellows 208 to contract and thereby decrease the slot width to maintain a substantially constant pressure drop across the injection slot 206 and a substantially constant slot velocity.

The precise size, shape, and composition of a bellows useful in the present invention may vary dependent on the composition of the first fluid, the range of flow rates, and the range of operating pressures in the fluid supply apparatus, but should be such that the bellows responds to changes in the fluid flow rates and pressures in the injected fluid supply apparatus yet is resilient and durable in the application. However, one of ordinary skill in the art should be able to determine these parameters without undue experimentation. In one preferred embodiment of the present invention, a bellows 208 for use with a supply of titanium tetrachloride was advantageously manufactured from Inconel nickel alloy available from Inco, Inc.

In one embodiment, the fluid mixing apparatus of the present invention is part of a reactor utilized in the process for producing titanium dioxide by reacting titanium tetrachloride vapor with oxygen. In general, the reactor comprises: an oxygen gas introduction assembly for receiving preheated oxygen from oxygen preheat equipment and for introducing the preheated oxygen into a conduit of a fluid mixing apparatus; a fluid supply apparatus supplying preheated titanium tetrachloride vapor from titanium tetrachloride preheat equipment; an adjustable slot providing fluidic communication between the fluid supply apparatus and the conduit; a means to automatically or remotely adjust the adjustable slot; and a reaction zone formed in the reactor downstream of the slot. The bellows shown in FIGS. 2-4 would constitute one means for automatically adjusting the adjustable slot, but those skilled in the art will readily conceive of other suitable means for adjusting the adjustable slot, whether automatically or remotely, for instance by external worm drives or other linear positioners.

The present invention has been advantageously utilized in a titanium dioxide production process. In a preferred embodiment, the present invention can be advantageously utilized to automatically adjust the titanium tetrachloride injection slot in a titanium dioxide production reactor to compensate for changes in the flow rate of titanium tetrachloride and maintain a substantially constant slot velocity. While the present invention has been described in detail with respect to this specific embodiment thereof, it will be appreciated that those skilled in the art, upon attaining an understanding of the foregoing, will anticipate that the present invention can be advantageously utilized in apparatus used to mix fluids other than titanium tetrachloride and oxygen. Additionally, one of ordinary skill in the art may readily conceive of alterations to, variations of and equivalents to these embodiments. Accordingly, the scope of the present invention should be assessed as that of the appended claims and by equivalents thereto.

What is claimed is:

1. A method for mixing two fluids, comprising the steps of:
   introducing a first fluid through a circumferential injection slot and into a conduit transporting a second fluid, wherein the circumferential injection slot is defined by a moveable wall that is transversely movable relative to the introduction of the first fluid therethrough; and
   automatically or remotely adjusting the circumferential injection slot, by transversely moving the moveable wall so as to adjust the width of the circumferential injection slot to maintain at least a certain slot velocity of the first fluid through the circumferential injection slot.

2. A method according to claim 1, wherein the injection slot is remotely adjusted to alter the slot velocity of the first fluid through the injection slot from a first value to a second value.

3. A method according to claim 1, wherein the circumferential injection slot is automatically adjusted to maintain a substantially constant slot velocity of the first fluid through the circumferential injection slot.

4. A method according to claim 3, wherein the substantially constant slot velocity is from about 200 feet per second to about 300 feet per second.

5. A method according to claim 3, wherein the step of automatically adjusting maintains a substantially constant pressure drop across the circumferential injection slot.

6. A method according to claim 5, wherein the substantially constant pressure drop is from about 1 psi to about 2 psi.

7. A method according to claim 5, wherein the circumferential injection slot is adjusted so that the introducing step is performed at a substantially constant pressure.

8. A method according to claim 7, wherein a bellows is utilized to maintain the substantially constant pressure of the introducing step.

9. A method according to claim 1, wherein the first fluid comprises titanium tetrachloride and the second fluid comprises oxygen.

10. A method according to claim 1, further comprising the step of remotely adjusting the circumferential injection slot to alter the slot velocity of the first fluid through the circumferential injection slot from a first value to a second value.

11. A method for mixing two fluids, comprising the steps of:
    introducing, at a first pressure, a first fluid through a circumferential injection slot and into a conduit transporting a second fluid, wherein the circumferential injection slot is defined by a moveable wall that is transversely movable relative to the introduction of the first fluid therethrough;
    monitoring the first pressure; and
    automatically or remotely adjusting the circumferential injection slot in accordance with the monitored first pressure by transversely moving the moveable wall so as to adjust the width of the circumferential injection slot.

12. A method according to claim 11, wherein the circumferential injection slot is adjusted to maintain a substantially constant first pressure.

13. A method according to claim 11, wherein the first fluid comprises titanium tetrachloride and the second fluid comprises oxygen.

14. A method for mixing two fluids, comprising the steps of:
    introducing, at a first flow rate and a first pressure, a first fluid through a circumferential injection slot and into a conduit transporting a second fluid, wherein the circumferential injection slot is defined by a moveable wall that is transversely movable relative to the introduction of the first fluid therethrough;
    monitoring the first flow rate; and
    automatically or remotely adjusting the size of the circumferential injection slot in accordance with the monitored first flow rate by transversely moving the moveable wall so as to adjust the width of the circumferential injection slot.

15. A method according to claim 14, wherein the circumferential injection slot is adjusted to maintain a substantially constant first pressure.

16. A method according to claim 14, wherein the first fluid comprises titanium tetrachloride and the second fluid comprises oxygen.

17. A method for adjusting a circumferential injection slot in an apparatus for injecting a first fluid into a conduit transporting a second fluid, the circumferential injection slot defined by a moveable wall that is transversely moveable relative to the injection of the first fluid therethrough, comprising the step of: automatically or remotely adjusting the circumferential injection slot to maintain a substantially constant slot velocity by transversely moving the moveable wall so as to adjust the width of the circumferential injection slot.

18. A method according to claim 17, wherein the automatically or remotely adjusting step maintains a substantially constant pressure drop across the circumferential injection slot.

19. A method according to claim 18, wherein the substantially constant pressure drop is from about 1 psi to about 2 psi.

20. A method according to claim 17, wherein the first fluid comprises titanium tetrachloride and the second fluid comprises oxygen.

21. A method for mixing two fluids, comprising the steps of:
    introducing a first fluid through a circumferential injection slot and into a conduit transporting a second fluid, wherein the circumferential injection slot is defined by a moveable wall that is transversely movable relative to the introduction of the first fluid therethrough; and
    automatically adjusting the circumferential injection slot, by transversely moving the moveable wall so as to adjust the width of the circumferential injection slot to maintain at least a substantially constant slot velocity of the first fluid through the circumferential injection slot and maintain a substantially constant pressure drop across the circumferential injection slot and so that the introducing step is preformed at a substantially constant pressure wherein a bellows is utilized to maintain the substantially constant pressure of the introducing step and the bellows has a side attached to the movable wall.

* * * * *